(12) United States Patent
Langford et al.

(10) Patent No.: US 6,760,387 B2
(45) Date of Patent: Jul. 6, 2004

(54) IMPULSE RADIO RECEIVER AND METHOD FOR FINDING ANGULAR OFFSET OF AN IMPULSE RADIO TRANSMITTER

(75) Inventors: David W. Langford, Madison, AL (US); Michael J. Nieburg, Huntsville, AL (US); Gregory A. Shreve, San Pedro, CA (US)

(73) Assignee: Time Domain Corp., Huntsville, AL (US)

( * ) Notice: Subject to any disclaimer, the term of this patent is extended or adjusted under 35 U.S.C. 154(b) by 196 days.

(21) Appl. No.: 09/957,745

(22) Filed: Sep. 21, 2001

(65) Prior Publication Data

US 2003/0058971 A1 Mar. 27, 2003

(51) Int. Cl.[7] .................................................. H04B 7/02
(52) U.S. Cl. ...................................................... 375/267
(58) Field of Search ................................. 375/139, 142, 375/150, 343, 347, 267, 299, 354; 342/424, 442

(56) References Cited

U.S. PATENT DOCUMENTS 4,443,801 A  *  4/1984  Klose et al. ................. 342/442
5,285,209 A  *  2/1994  Sharpin et al. .............. 342/424
5,982,808 A  * 11/1999  Otto ............................ 375/139

OTHER PUBLICATIONS

International Search Report for PCT Appl. No.PCT/US02/29431.

* cited by examiner

*Primary Examiner*—Don N. Vo
(74) *Attorney, Agent, or Firm*—George P. Kobler; William J. Tucker

(57) ABSTRACT

A system and method for determining angular offset of an impulse radio transmitter using an impulse radio receiver coupled to two antennae. The antennae are separated by some known distance, and, in one embodiment, one antennae is coupled to the radio with cable delay. Impulse signals from the antennae are measured to determine the time difference of arrival of one such signal received by one antenna compared to that of the other antenna. Time differential is measured by autocorrelation of the entire impulse radio scan period, by detecting the leading edges of both incoming signals or various combinations of these methods. Using a tracking receiver, the pulses may be continuously tracked thus providing real time position information.

27 Claims, 21 Drawing Sheets

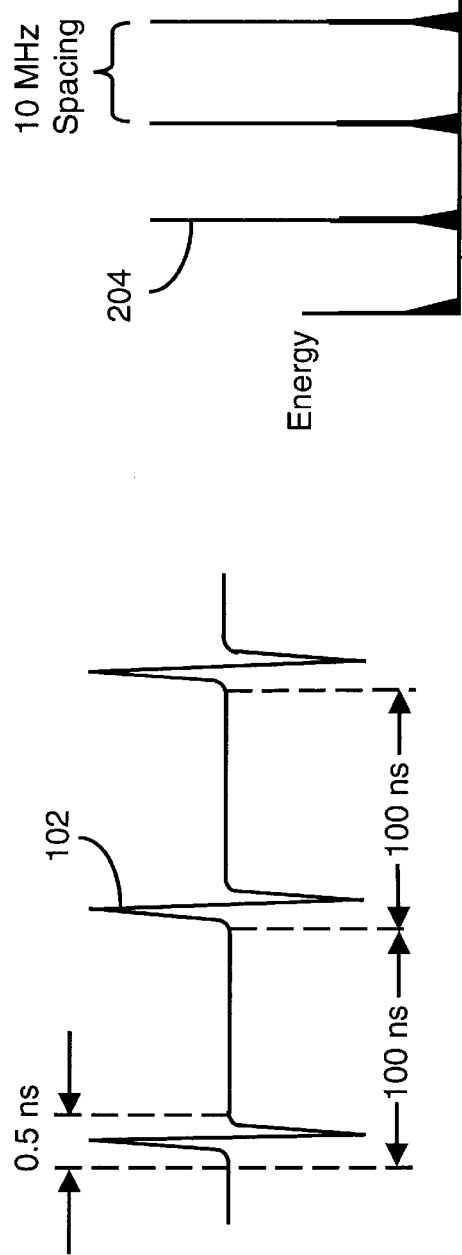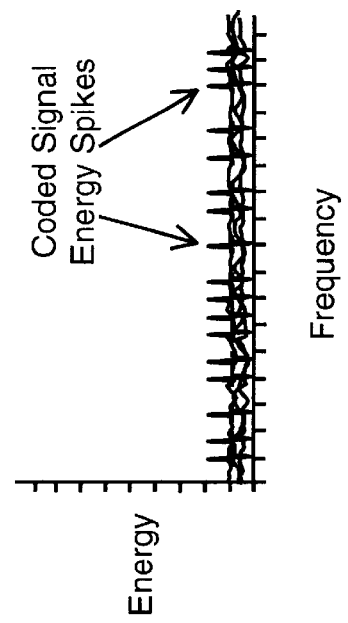

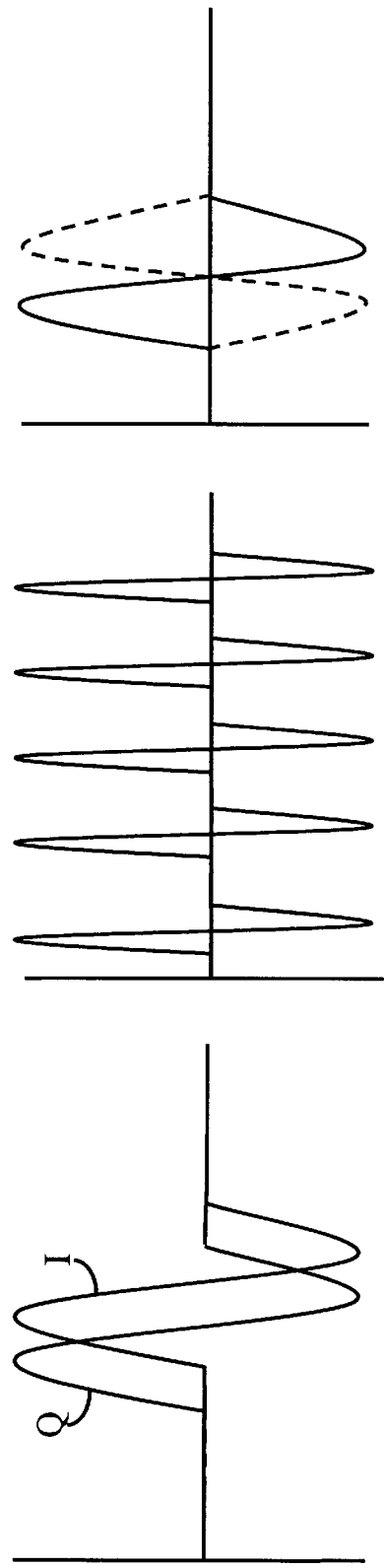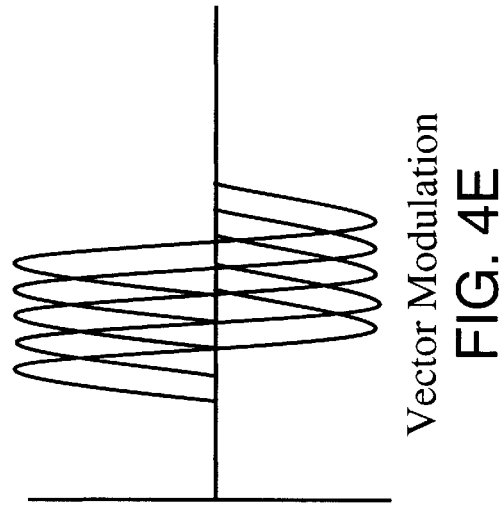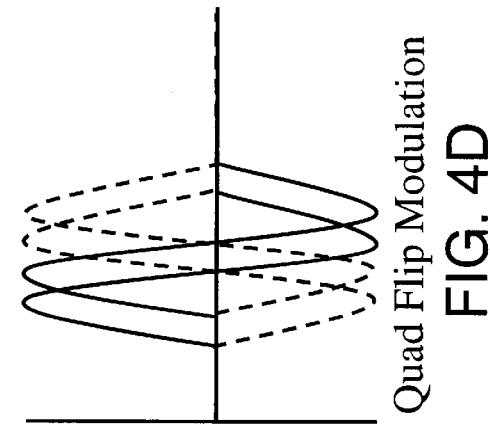

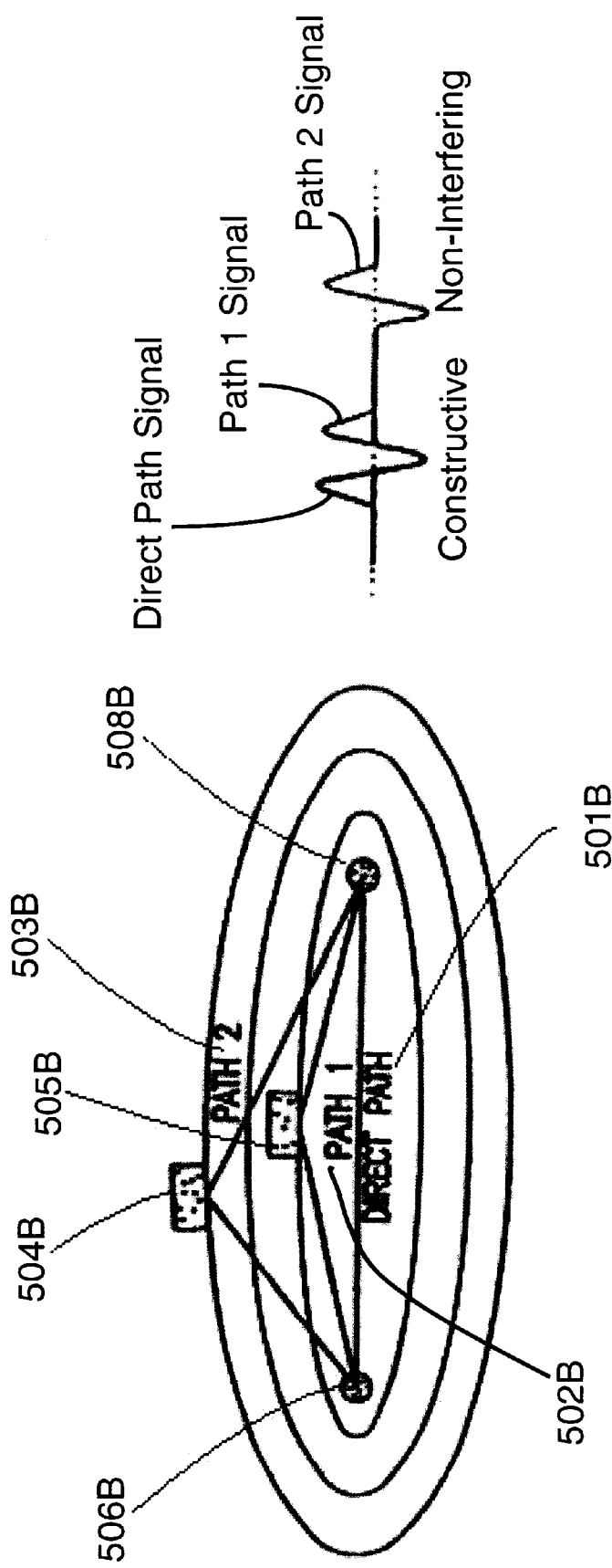

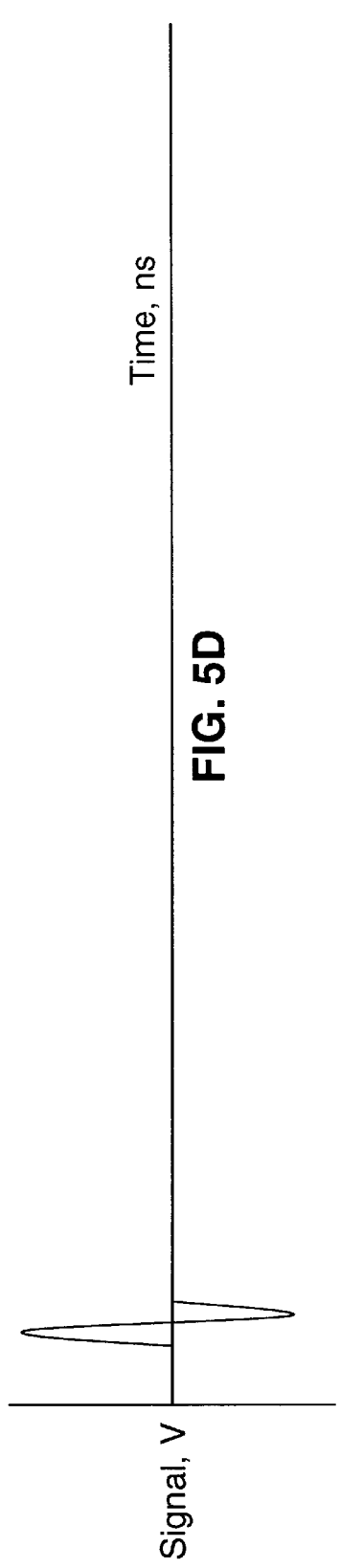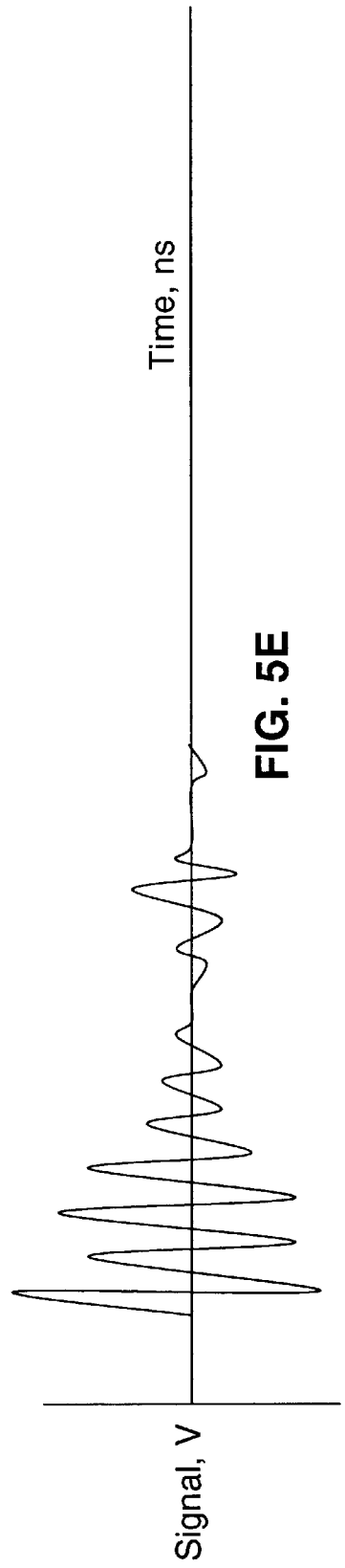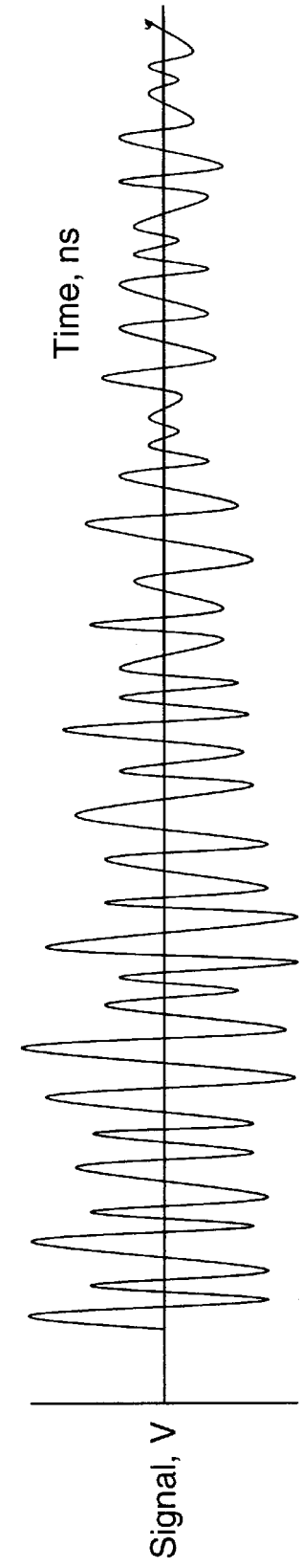

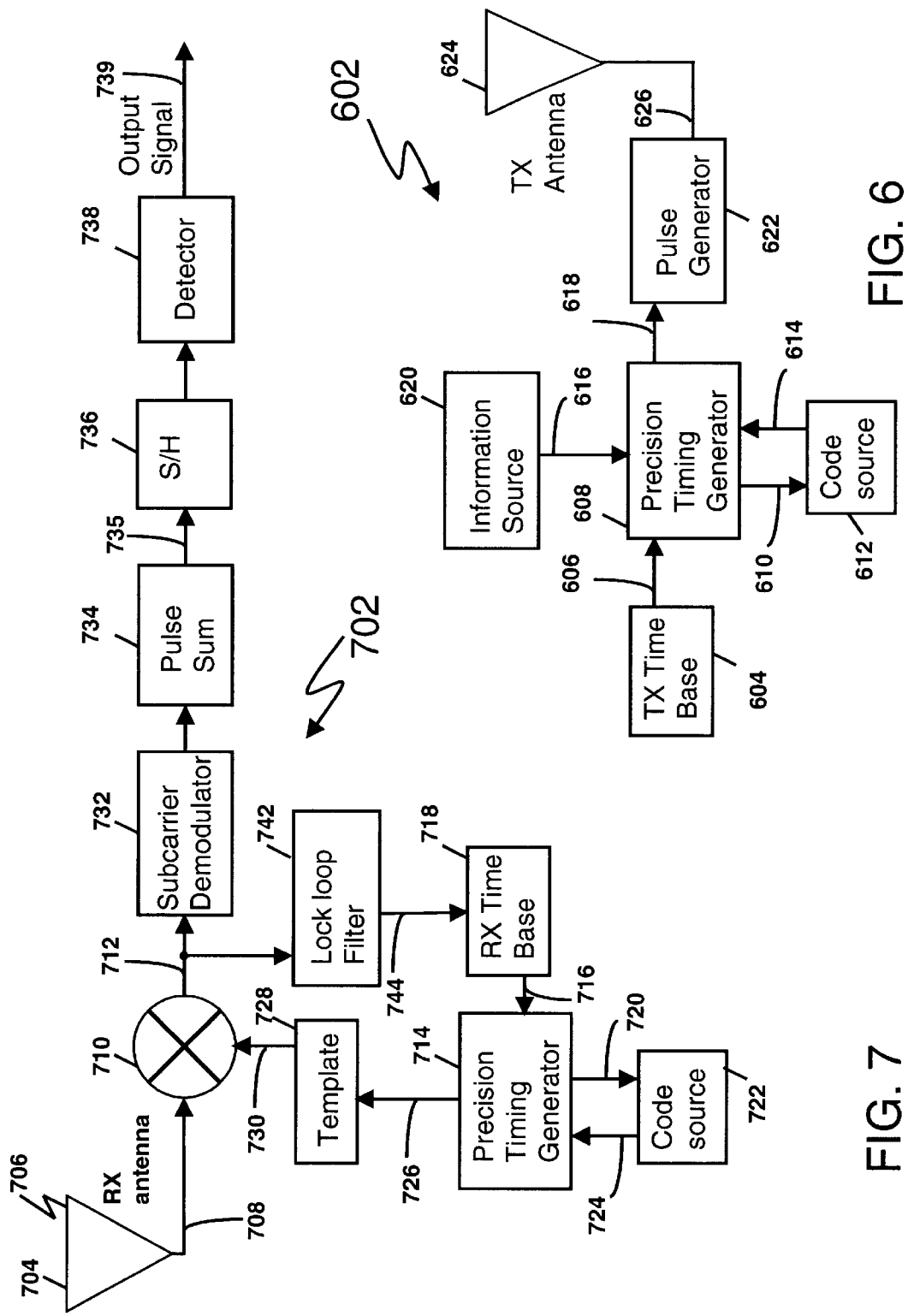

US 6,760,387 B2

IMPULSE RADIO RECEIVER AND METHOD FOR FINDING ANGULAR OFFSET OF AN IMPULSE RADIO TRANSMITTER

RELATED ART

Recent advances in communications technology have enabled an emerging, revolutionary ultra-wideband technology (UWB) called impulse radio communications systems (hereinafter called impulse radio).

Impulse radio has been described in a series of patents, including the following, which are incorporated herein by reference: U.S. Pat. No. 4,641,317, issued Feb. 3, 1987 to Larry W. Fullerton; U.S. Pat. No. 4,813,057, issued Mar. 14, 1989 to Larry W. Fullerton; U.S. Pat. No. 4,979,186, issued Dec. 18, 1990 to Larry W. Fullerton; and U.S. Pat. No. 5,363,108, issued Nov. 8, 1994 to Larry W. Fullerton. A second generation of impulse radio patents include the following, which are incorporated herein by reference: U.S. Pat. No. 5,677,927, issued Oct. 14, 1997 to Fullerton et al.; U.S. Pat. No. 5,687,169 issued Nov. 11, 1997 to Fullerton et al.; and U.S. Pat. No. 5,832,035, issued Nov. 3, 1998 to Fullerton et al.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval may be varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain, and interference suppression.

Generally speaking, an impulse radio receiver is a direct conversion receiver with a cross-correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. As an option, the impulse radio receiver can integrate multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods.

Radio frequency (RF) applications for positioning, locating and tracking are widely known. The Global Positioning System (GPS) is a popular example of an RF positioning application. Some other examples include RF tags, military air combat maneuvering indicators (ACMI) and asset and people tracking devices.

For example, commonly-owned U.S. Pat. No. 6,111,536, "System and Method for Distance Measurement by Inphase and Quadrature Signals in a Radio System," to Richards, et al, (issued Aug. 29, 2000), and commonly-owned U.S. Pat. No. 6,483,461 "Apparatus and Method for Locating Objects in a Three Dimensional Space," (issued Nov. 19, 2002) teach various methods to employ a network of fixed reference radios to find the positions of one or more mobile impulse radios. Positioning methods taught therein include multi-lateration using multiple signal time-of-arrival (TOA) computations among the various radios, coupled with angle information calculated using differential time-of-arrival (DTOA) from at least two reference radios in the network. A limitation common among these inventions is the requirement for multiple radios to determine the position of another.

Single radio implementations related to positioning exist. Impulse radios have been used to measure distance of other radios by analyzing the free space signal propagation loss as discussed in commonly owned an co-pending application Ser. No. 09/537,263 "System and Method of Estimating Separation Distance Between Impulse Radios Using Impulse Signal Amplitude" (filed Mar. 29, 2000). However, without relative angle information or distance information from another source, the position of the opposing radio cannot be determined. Additionally, U.S. Pat. No. 6,133,876, "System and Method for Position Determination By Impulse Radio," to Fullerton, et al, (issued Oct. 17, 2000), describes using multiple impulse radio transceivers to determine relative distances of said transceivers with respect to each other and deriving each transceiver's position in terms of Cartesian coordinates via multi-lateration. The patent also teaches use of one transceiver to position another, however, the transceiver uses TOA ranging and must employ a direction finding antenna in addition to the ultra wideband antennae transmitting and receiving the impulse signals.

There are technologies that employ single units to determine angular position of objects. For example, U.S. Pat. No. 4,017,854, "Apparatus for Angular Measurement and Beam Forming with Baseband Radar Systems," to Ross (issued Apr. 12, 1977), describes a pulsed radar system comprised of two separated receiving antennae, said system being capable of estimating the relative angle of an illuminated object using DTOA. However, baseband systems, compared to impulse systems, use much greater transmit power and are not very well channelized rendering such systems very susceptible to interference. Thus, they tend to be impractical for applications other than in electromagnetically clear space or in areas in which interference with other systems is not a concern.

Hence, there exists a need in the art for a single unit that may estimate the location of an RF emitter. In particular, there exists a need in the art for a single apparatus capable of approximating the position of an impulse radio transmitter.

SUMMARY OF THE INVENTION

An impulse radio receiver capable of determining angular offset, and thus position, of a transmitting impulse radio includes two antennae disposed within the receiver such that they are separated by some distance. Both antennae are coupled to an impulse radio, preferably utilizing a multiple correlator design. One version of the invention incorporates a cable delay into one of the antenna-radio couplings.

The transmitted signal is received by the impulse radio in the form of two pulses, one from each antenna. One pulse may be delayed in time with respect to the other, by virtue of the cable delay for embodiments employing this structure, and by virtue of the transmitter geometry with respect to the receiver creating a longer time of flight for the signal received at the opposite antenna. The delay of one signal with respect to the other is measured and the angle of offset may be approximated.

Time delay may be measured by a variety of ways in this system. Such techniques include autocorrelating the composite waveform and measuring the distance between correlation output peaks in the time domain. Additionally, using pulse leading edge detection algorithms, the leading edges of the pulse may be found and the delay between the leading edges may be measured directly. Various combinations of both techniques are also employed. Another embodiment describes using two synchronized impulse radios and employing the same techniques.

Those skilled in the art will appreciate that the design may incorporate three or more antennae similarly coupled to the receiving radio with cable delays. A three-antennae version would yield two forms of offset angle information depending on the configuration: (1) two offset angles in the same plane; or (2) offset angles in two dimensions. This information will facilitate more accurate positioning of the transmitter in two dimensions or estimation of transmitter position in three dimensions respectively. Addition of a fourth antenna would enable three-dimensional positioning.

Because of the high pulse rate and improved data processing over prior systems angular error is much improved allowing for closer spacing within the antennae array. In fact, another version teaches maintaining scanning receiver locks on the arriving pulses thereby allowing position information to update at the bit rate. This is desirable for applications requiring position information for fast moving objects.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 2A illustrates a pulse train comprising pulses as in FIG. 1A;

FIG. 2B illustrates the frequency domain amplitude of the waveform of FIG. 2A;

FIG. 2C illustrates the pulse train spectrum;

FIG. 2D is a plot of the Frequency vs. Energy Plot and points out the coded signal energy spikes;

FIGS. 4A–4E illustrate five modulation techniques to include: Early-Late Modulation; One of Many Modulation; Flip Modulation; Quad Flip Modulation; and Vector Modulation;

FIG. 5B depicts a typical geometrical configuration giving rise to multipath received signals;

FIG. 5C illustrates exemplary multipath signals in the time domain;

FIGS. 5D–5F illustrate a signal plot of various multipath environments.

FIG. 6 illustrates a representative impulse radio transmitter functional diagram;

FIG. 7 illustrates a representative impulse radio receiver functional diagram;

DETAILED DESCRIPTION OF THE EMBODIMENTS

Overview of the Invention

Figure 1A:
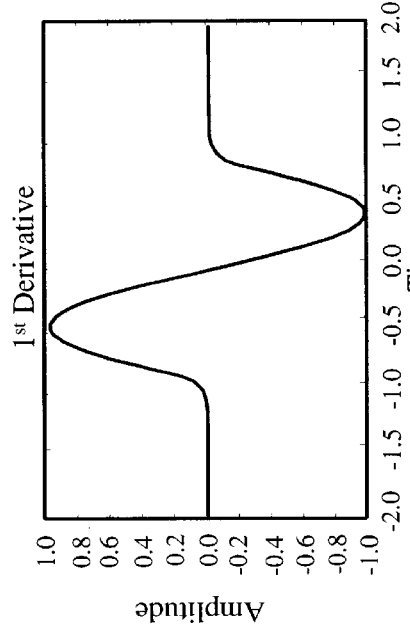
FIG. 1A illustrates a representative Gaussian Monocycle waveform in the time domain.
Figure 1B:
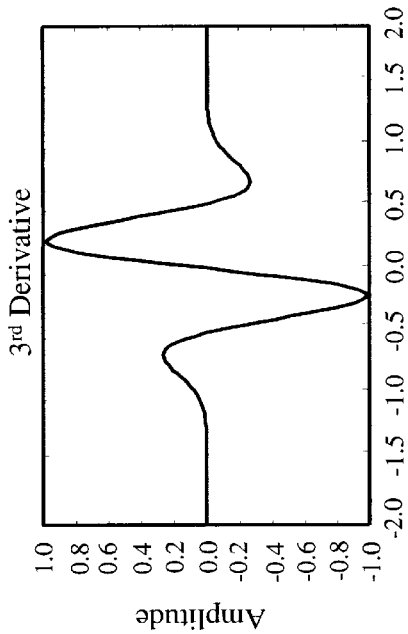
FIG. 1B illustrates the frequency domain amplitude of the Gaussian Monocycle of FIG. 1A.
Figure 1C:
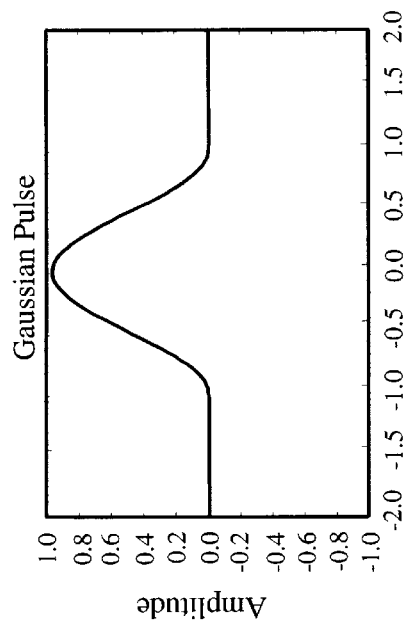
FIG. 1C represents the second derivative of the Gaussian Monocycle of FIG. 1A.
Figure 1D:
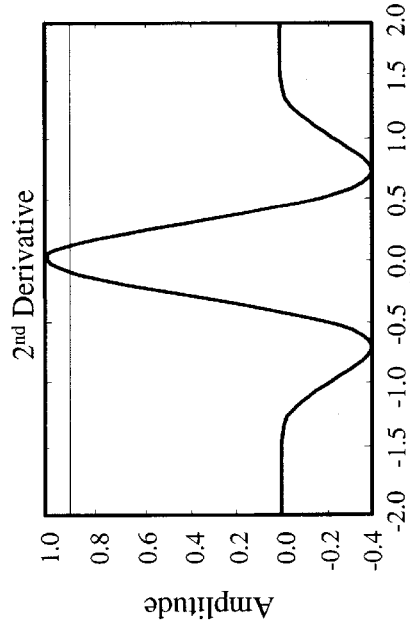
FIG. 1D represents the third derivative of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Technology Overview

Recent advances in communications technology have enabled ultra wideband technology (UWB) or impulse radio communications systems "impulse radio". To better understand the benefits of impulse radio to the present invention, the following review of impulse radio follows. Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al.

Uses of impulse radio systems are described in U.S. Pat. No. 6,177,903, titled, "System and Method for Intrusion Detection using a Time Domain Radar Array" (issued January 23, 2001) and U.S. Pat. No. 6,218,979 B1, titled, "Wide Area Time Domain Radar Array" (issued Apr. 17, 2001) both of which are assigned to the assignee of the present invention. The above patent documents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
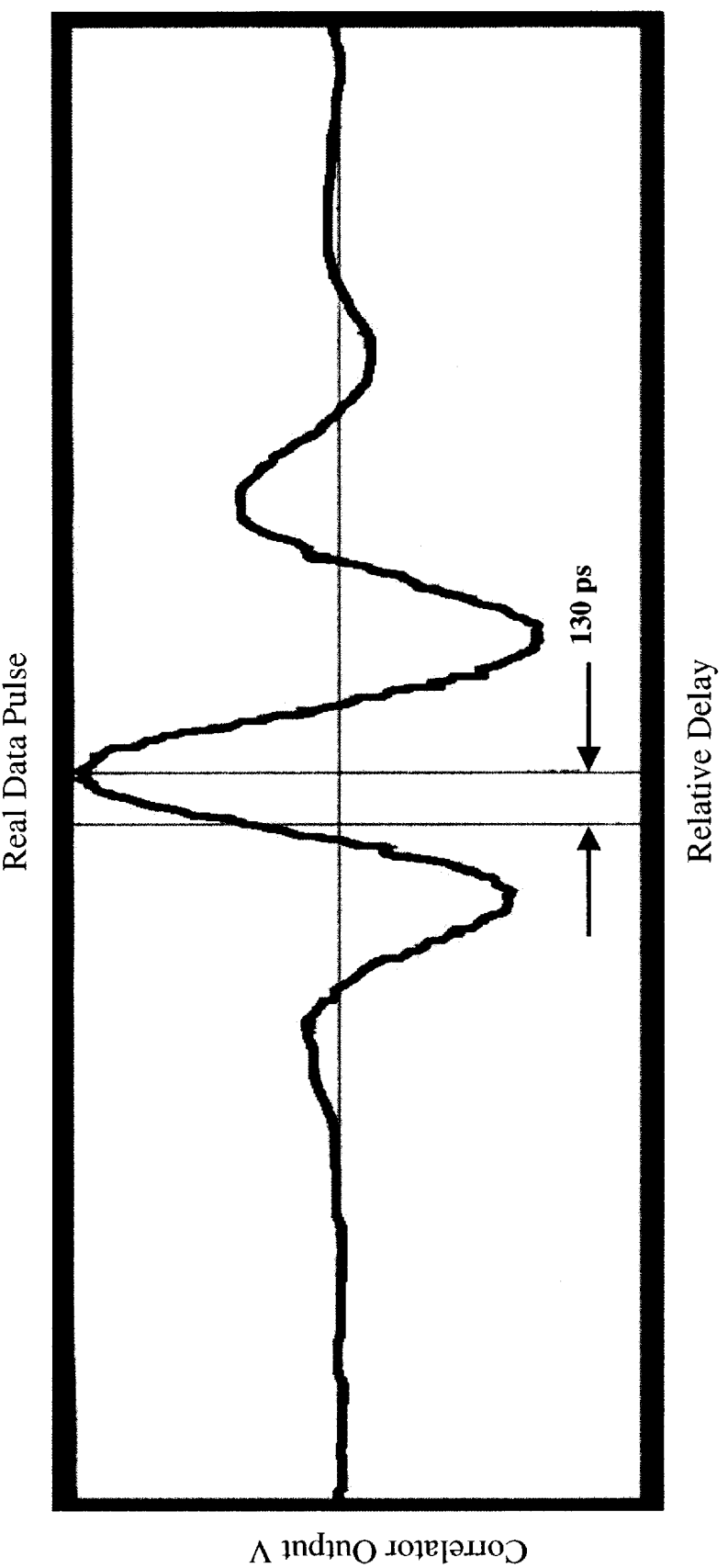
FIG. 1E represents the Correlator Output vs. the Relative Delay in a real data pulse.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base.

Figure 1F:
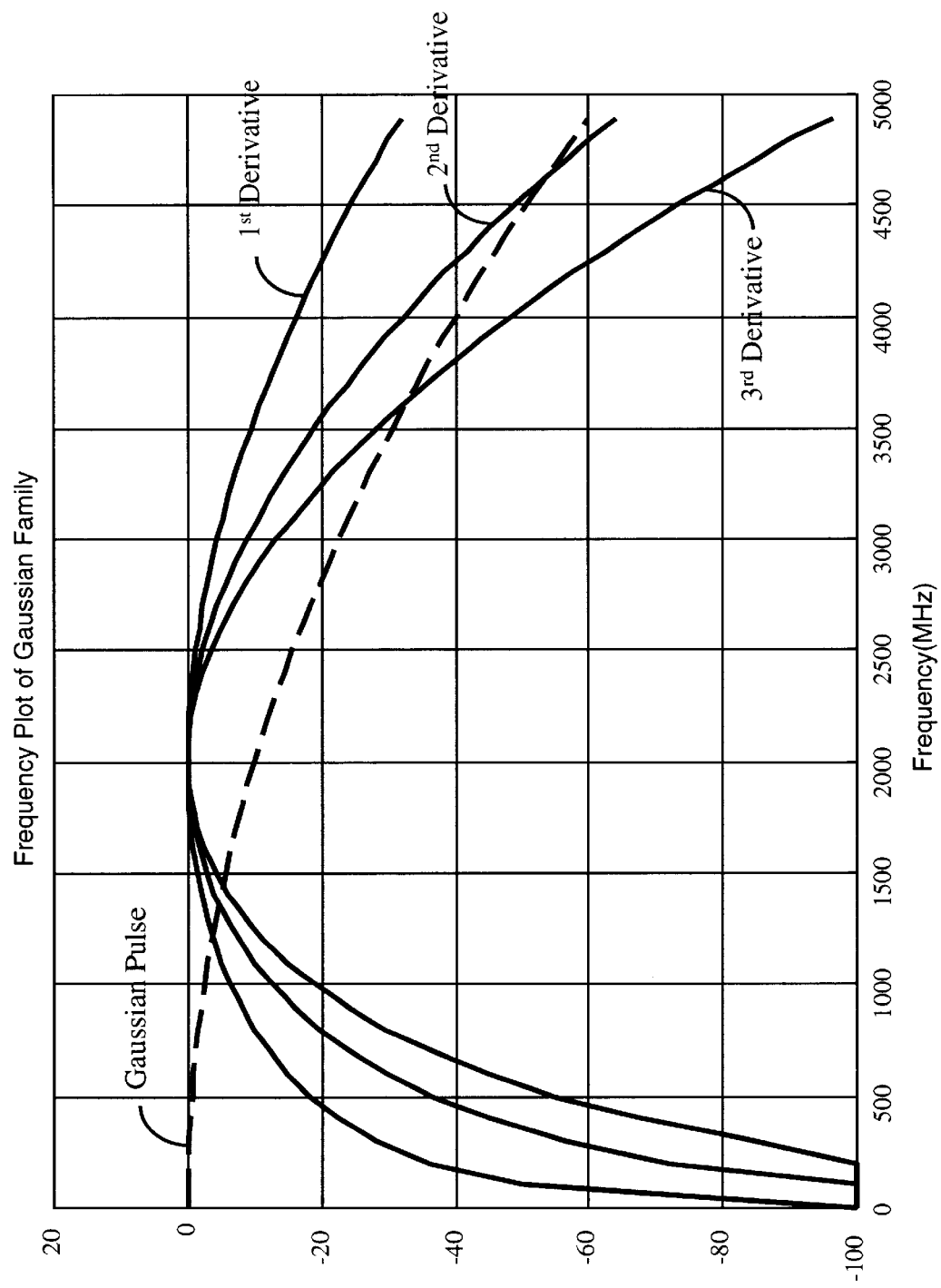
FIG. 1F depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}} \sigma f e^{-2(\pi \sigma f)^2}$$

The center frequency ($f_c$) or frequency of peak spectral density, of the Gaussian monocycle is:

$$f_c = \frac{1}{2\pi\sigma}$$

It should be noted that the output of an ultra-wideband antenna is essentially equal to the derivative of its input. Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Pulse Trains

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, $\omega(t, b)$ is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left| \sum_{i=1}^{n} \frac{e^{j\Delta t}}{n} \right|$$

where $A(\omega)$ is the amplitude of the spectral response at a given frequency, $\omega$ is the frequency being analyzed ($2\pi f$), $\Delta t$ is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
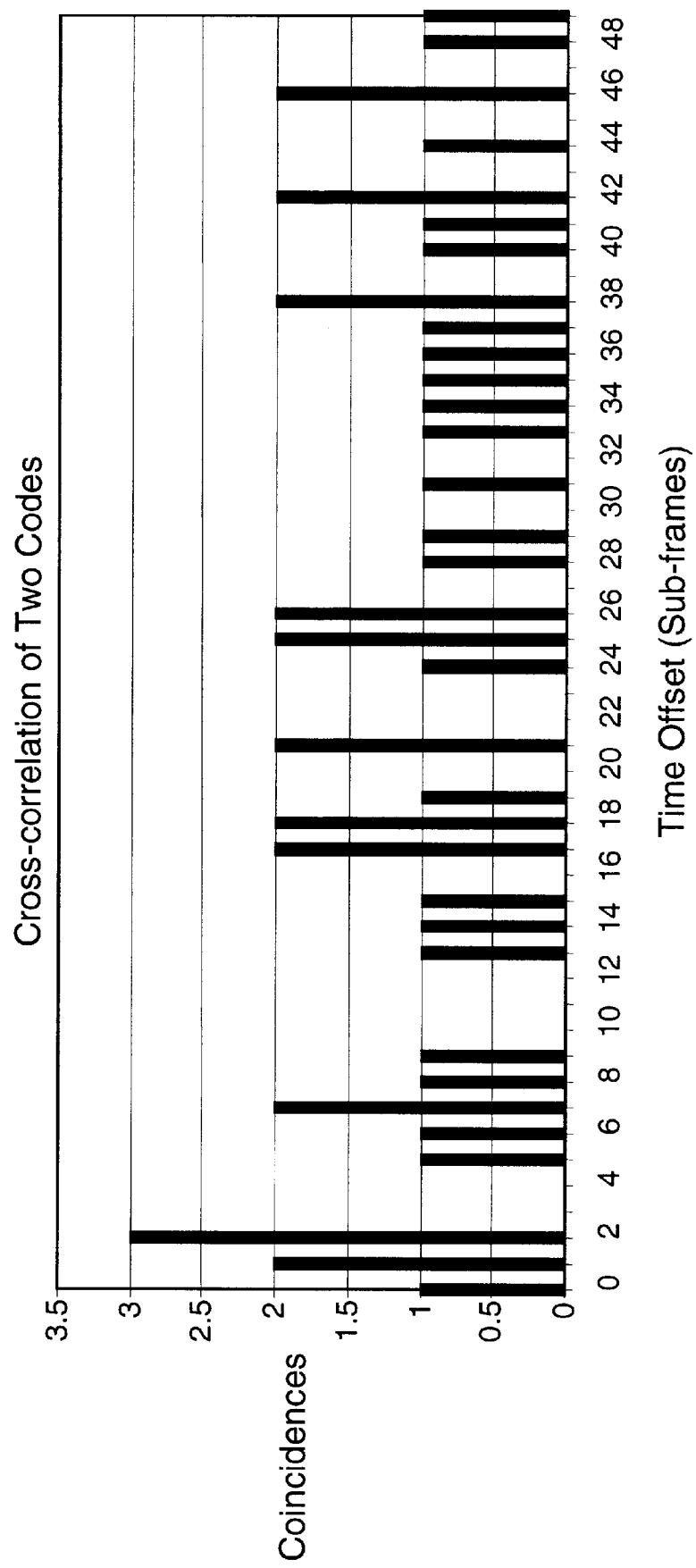
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," U.S. Pat. No. 6,636,567, issued Oct. 21, 2003, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," Application No. 09/592,248 filed Jun. 12, 2000, and incorporated herein by reference.

The signal of a coded pulse train can be generally expressed by:

$$s_{tr}^{(k)}(t) = \sum_{j} (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t, b_j^{(k)})$ are the coded polarity, pulse amplitude, pulse type, pulse width, and normalized pulse waveform of the jth pulse of the kth transmitter, and $T_j^{(k)}$ is the coded time shift of the jth pulse of the kth transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register(s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned U.S. Pat. No. 6,636,566 titled "A Method and Apparatus for Specifying Pulse Characteristics using a Code that Satisfies Predefined Criteria," and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A pulse train with conventional 'early-late' time-shift modulation can be expressed:

$$s_{tr}^{(k)}(t) = \sum_{j} (-1)^{f_j^{(k)}} a_j^{(k)} \omega(c_j^{(k)} t - T_j^{(k)} - \delta d_{\lfloor j/N_s \rfloor}^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t, b_j^{(k)})$ are the coded polarity, pulse amplitude, pulse type, pulse width, and normalized pulse waveform of the jth pulse of the kth transmitter, $T_j^{(k)}$ is the coded time shift of the jth pulse of the kth transmitter, $\delta$ is the time shift added when the transmitted symbol is 1 (instead of 0), $d^{(k)}$ is the data (i.e., 0 or 1) transmitted by the kth transmitter, and $N_s$ is the number of pulses per symbol (e.g., bit). Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see U.S. patent application Ser. No. 09/875,290 titled "Apparatus, System and Method for One-of-Many Position Modulation in an Impulse Radio Communication System," and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
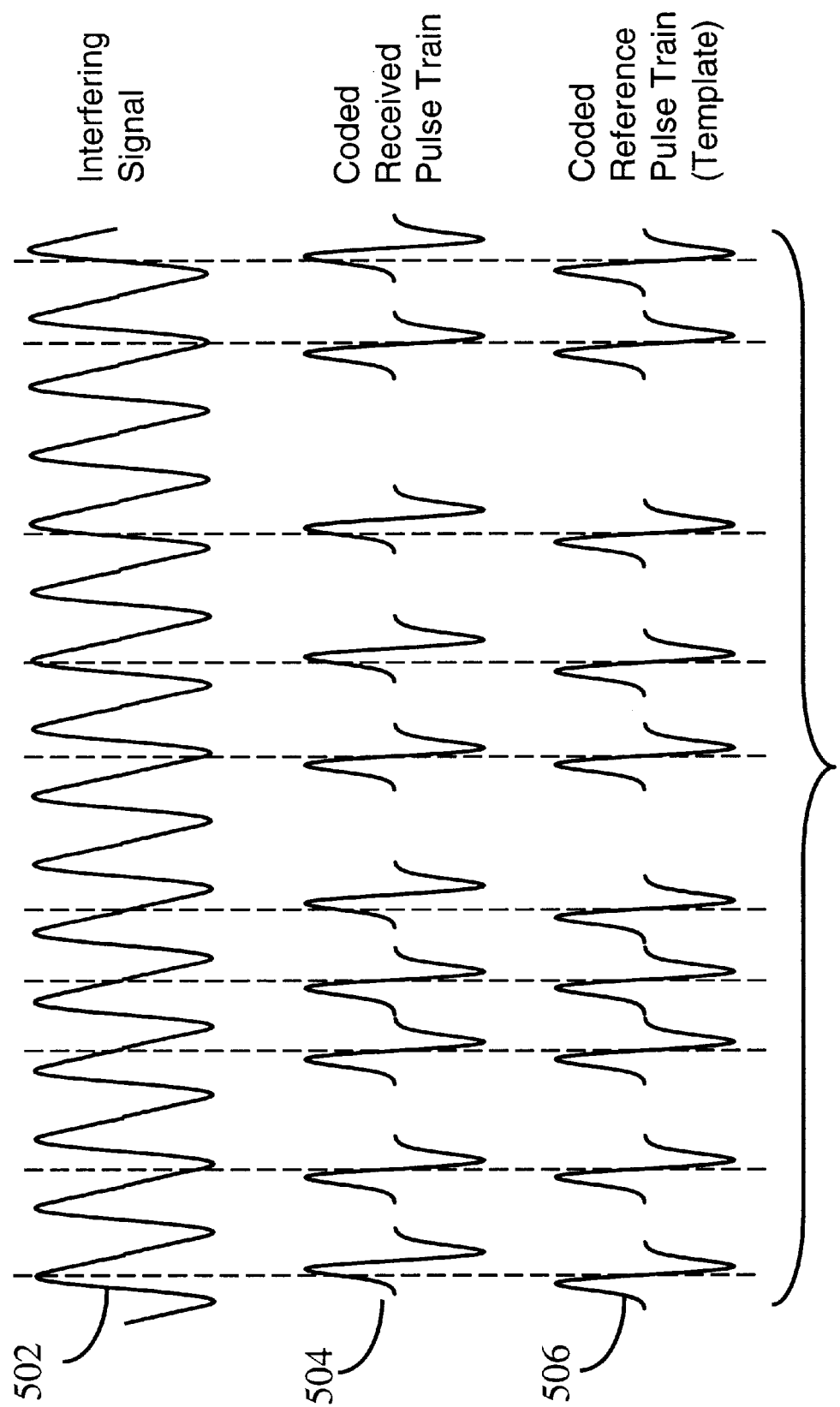
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_l m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec2}$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t-\delta)]\,dt$$

and $$\sigma_a^2 = T_f^{-1} \int_{-\infty}^{\infty} \left[ \int_{-\infty}^{\infty} \omega(t-s)v(t)\,dt \right]^2 ds,$$

where ω(t) is the monocycle waveform, υ(t)=ω(t)−ω(t−δ) is the template signal waveform, δ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path 2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

Figure 5G:
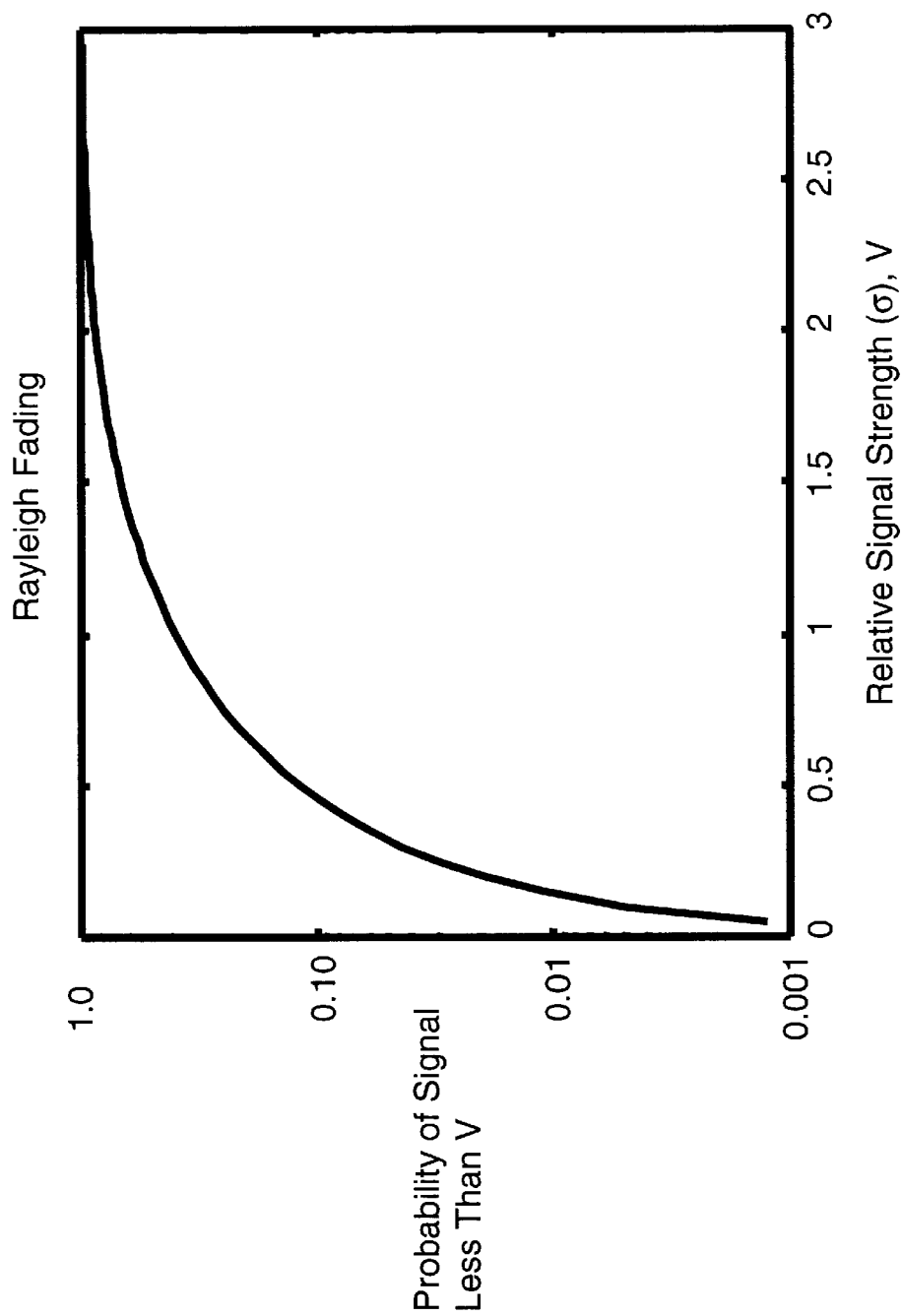
FIG. 5G illustrates the Rayleigh fading curve associated with non-impulse radio transmissions in a multipath environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 5B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 5G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5H:
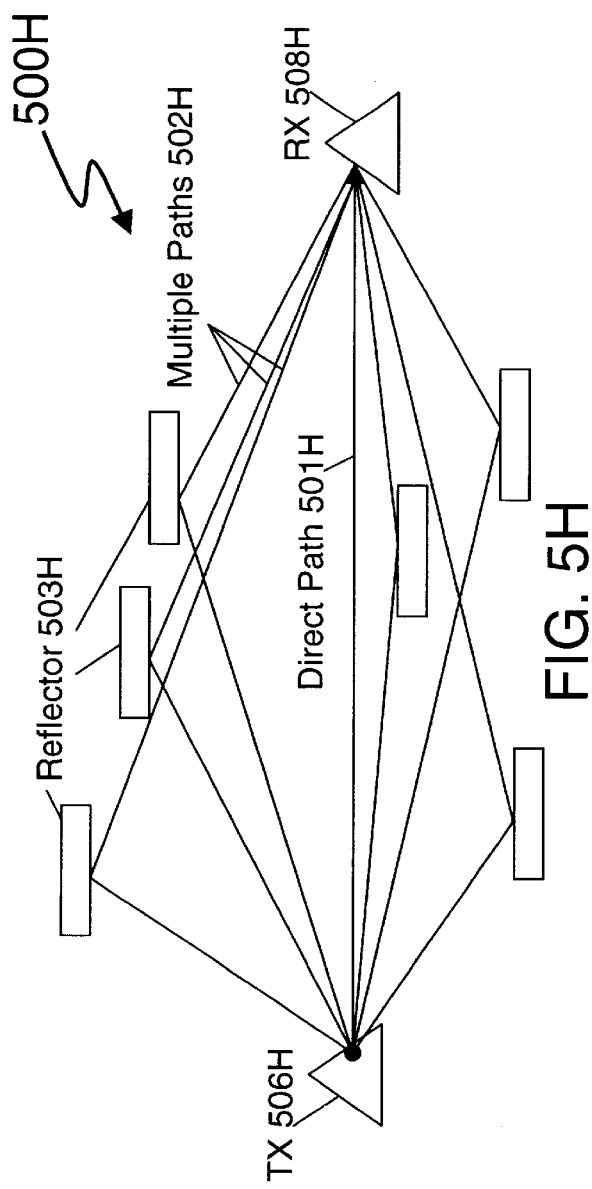
FIG. 5H illustrates a plurality of multipaths with a plurality of reflectors from a transmitter to a receiver.
Figure 5I:
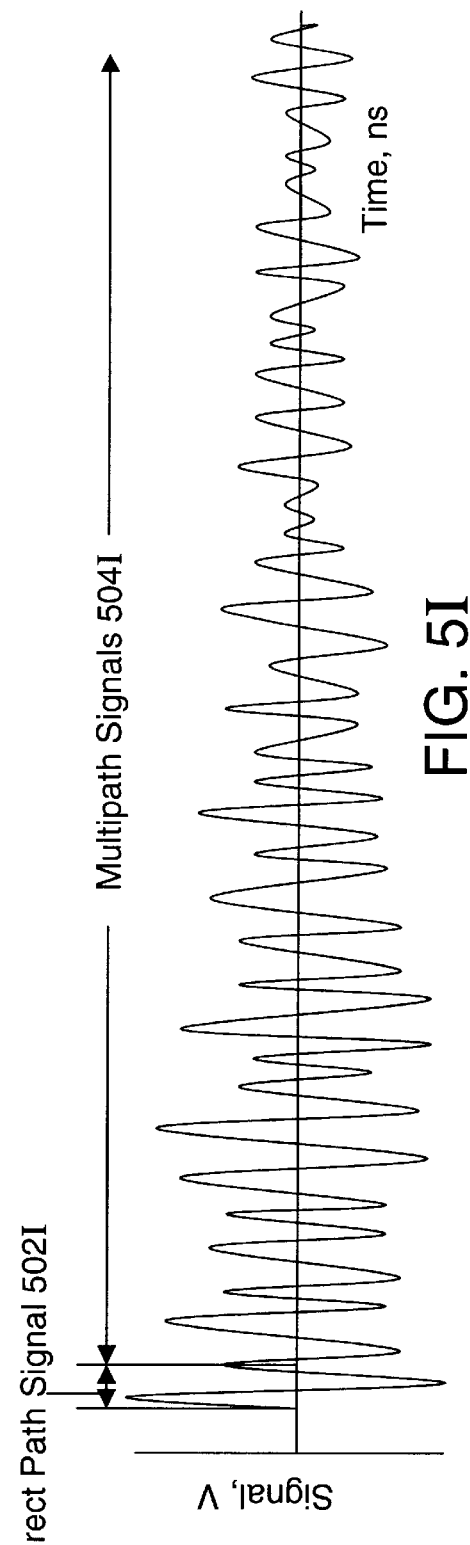
FIG. 5I graphically represents signal strength as volts vs. time in a direct path and multipath environment.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIGS. 5H and 5I. FIG. 5H depicts an impulse radio system in a high multipath environment 500H consisting of a transmitter 506H and a receiver 508H. A transmitted signal follows a direct path 501H and reflects off reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. In the same manner described earlier for FIGS. 5B and 5C, the direct path signal 502I is sampled, while the multipath signals 504I are not, resulting in Rayleigh fading avoidance.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has no multi-cycle ambiguity, it is possible to determine waveform position to less than a wavelength, potentially down to the noise floor of the system. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method is described in co-owned U.S. Pat. No. 6,300,903 B1 titled "System and Method for Person or Object Position Location Utilizing Impulse Radio," and incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of impulse radio power control, see U.S. Pat. No. 6,539,213 titled "System and Method for Impulse Radio Power Control," and incorporated herein by reference.

Mitigating Effects of Interference

A method for mitigating interference in impulse radio systems comprises the steps of conveying the message in packets, repeating conveyance of selected packets to make up a repeat package, and conveying the repeat package a plurality of times at a repeat period greater than twice the period of occurrence of the interference. The communication may convey a message from a proximate transmitter to a distal receiver, and receive a message by a proximate receiver from a distal transmitter. In such a system, the method comprises the steps of providing interference indications by the distal receiver to the proximate transmitter, using the interference indications to determine predicted noise periods, and operating the proximate transmitter to convey the message according to at least one of the following: (1) avoiding conveying the message during noise periods, (2) conveying the message at a higher power during noise periods, (3) increasing error detection coding in the message during noise periods, (4) re-transmitting the message following noise periods, (5) avoiding conveying the message when interference is greater than a first strength, (6) conveying the message at a higher power when the interference is greater than a second strength, (7) increasing error detection coding in the message when the interference is greater than a third strength, and (8) re-transmitting a portion of the message after interference has subsided to less than a predetermined strength.

For greater elaboration of mitigating interference in impulse radio systems, see the patent application titled "Method for Mitigating Effects of Interference in Impulse Radio Communication," application Ser. No. 09/587,033, filed Jun. 02, 1999, assigned to the assignee of the present invention, and incorporated herein by reference.

Moderating Interference in Equipment Control Applications

Yet another improvement to impulse radio includes moderating interference with impulse radio wireless control of an appliance. The control is affected by a controller remote from the appliance which transmits impulse radio digital control signals to the appliance. The control signals have a transmission power and a data rate. The method comprises the steps of establishing a maximum acceptable noise value for a parameter relating to interfering signals and a frequency range for measuring the interfering signals, measuring the parameter for the interference signals within the frequency range, and effecting an alteration of transmission of the control signals when the parameter exceeds the maximum acceptable noise value.

For greater elaboration of moderating interference while effecting impulse radio wireless control of equipment, see U.S. Pat. No. 6,571,089 titled "Method and Apparatus for Moderating Interference While Effecting Impulse Radio Wireless Control of Equipment," and incorporated herein by reference.

Exemplary Transceiver Implementation

Transmitter

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses are called the emitted signal, and propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 is coupled to a subcarrier demodulator 732, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to position in time the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8B:
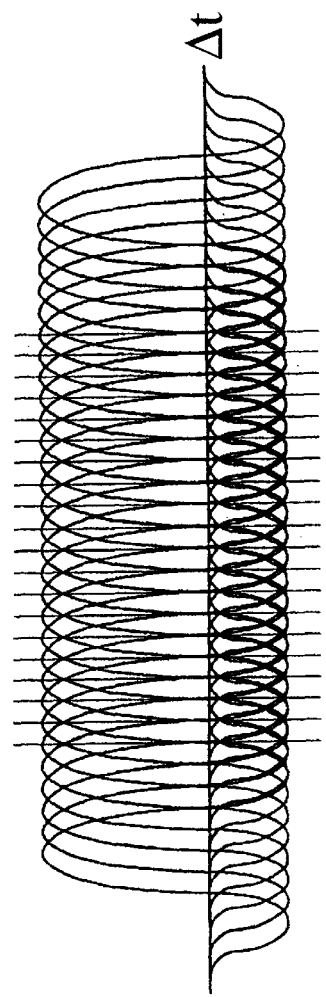
FIG. 8B illustrates a sequence of representative impulse signals in the correlation process.
Figure 8A:
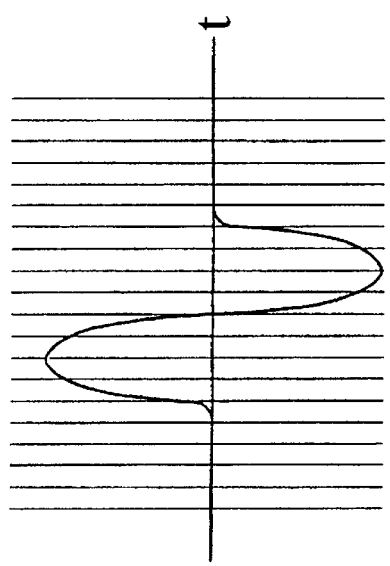
FIG. 8A illustrates a representative received pulse signal at the input to the correlator.
Figure 8C:
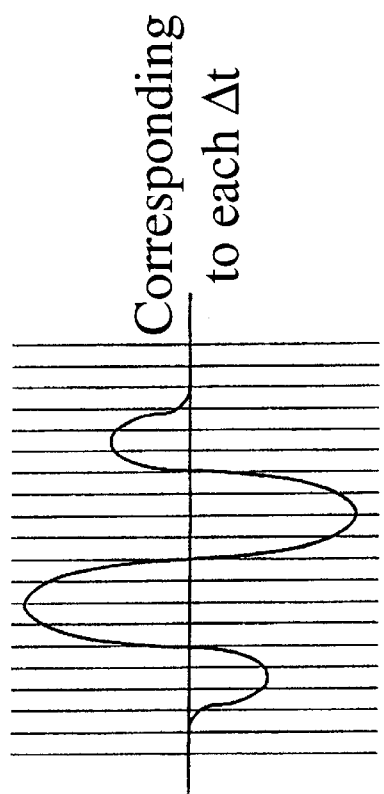
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the cross correlator for each of the time offsets of FIG. 8B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned U.S. Pat. No. 6,304,623 B1 titled "Precision Timing Generator System and Method;" both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see U.S. Pat. No. 6,556,621 titled "Method and System for Fast Acquisition of Ultra Wideband Signals," and incorporated herein by reference.

A receiver has been developed that includes a baseband signal converter device and combines multiple converter circuits and an RE amplifier in a single integrated circuit package. For greater elaboration of this receiver, see U.S. Pat. No. 6,421,389 B1 the patent application titled "Baseband Signal Converter for a Wideband Impulse Radio Receiver," and incorporated herein by reference.

Impulse Radio Receiver and Method for Approximating Angular Offset

Figure 9:
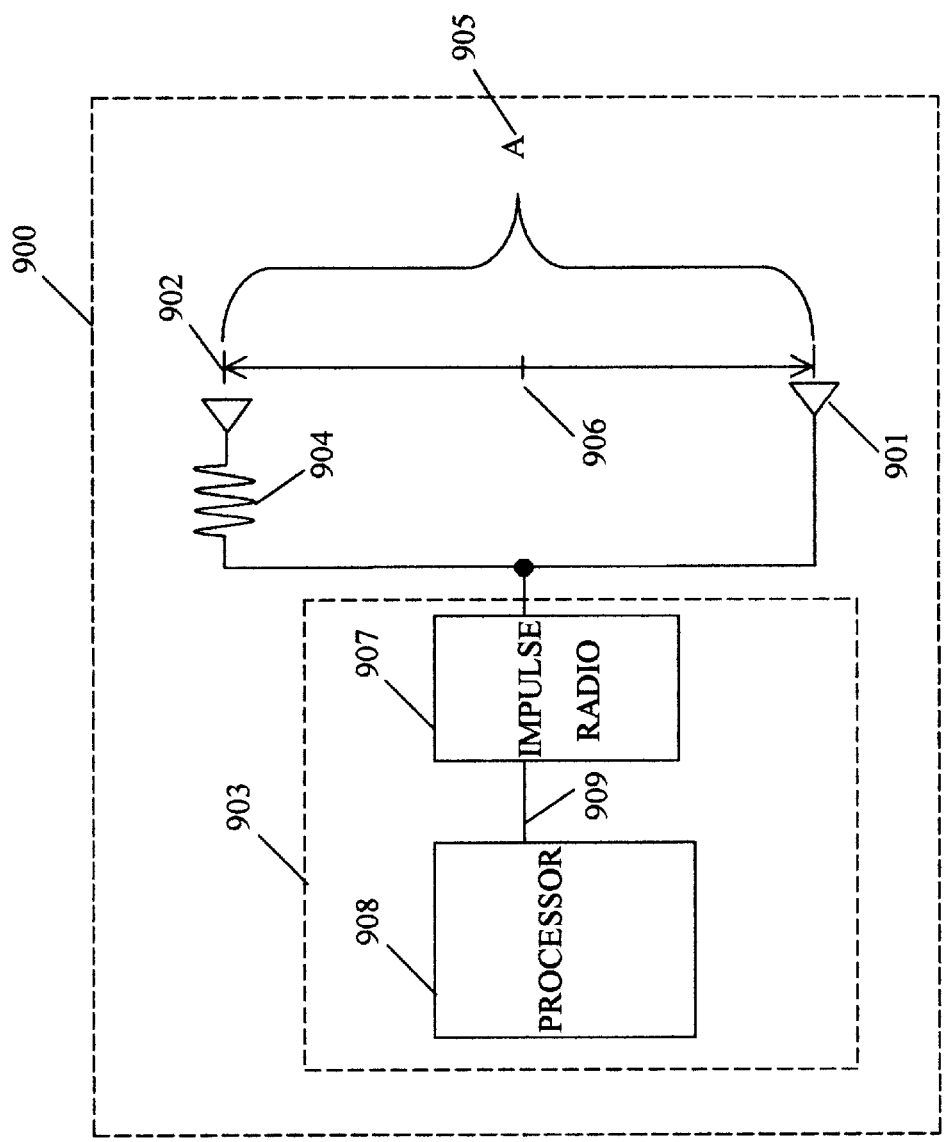
FIG. 9 is a functional diagram of the basic system.

With respect to the invention claimed in this application, a basic embodiment is understood more fully with reference to FIG. 9. An impulse radio receiver 900 comprises two UWB antennae, a first antenna 901 and a second antenna 902 connected to an impulse radio receiver 903. The second antenna 902 is connected with a cable delay 904 thereby imparting to the signal received at the radio 907 a delay with respect to the signal received from the first antenna 901. Furthermore, the antennae are disposed within the receiver unit separated by a known distance, in this example, A 905, where A/2 is the distance from an antenna to some midpoint reference 906 between both antennae. The impulse radio receiver 903 comprises a correlating impulse radio 907 for coherent detection of impulse radio pulses as described above in addition to a processor 908 which receives output 909 from the impulse radio 907 and performs necessary computations. Another embodiment utilizes an impulse radio with a multiple correlator design disclosed in co-owned and co-pending application Ser. No. 09/537,264 incorporated herein by reference, wherein at least one correlator is enabled to scan the received waveforms and another has the ability to track a specific pulse in time.

Figure 10:
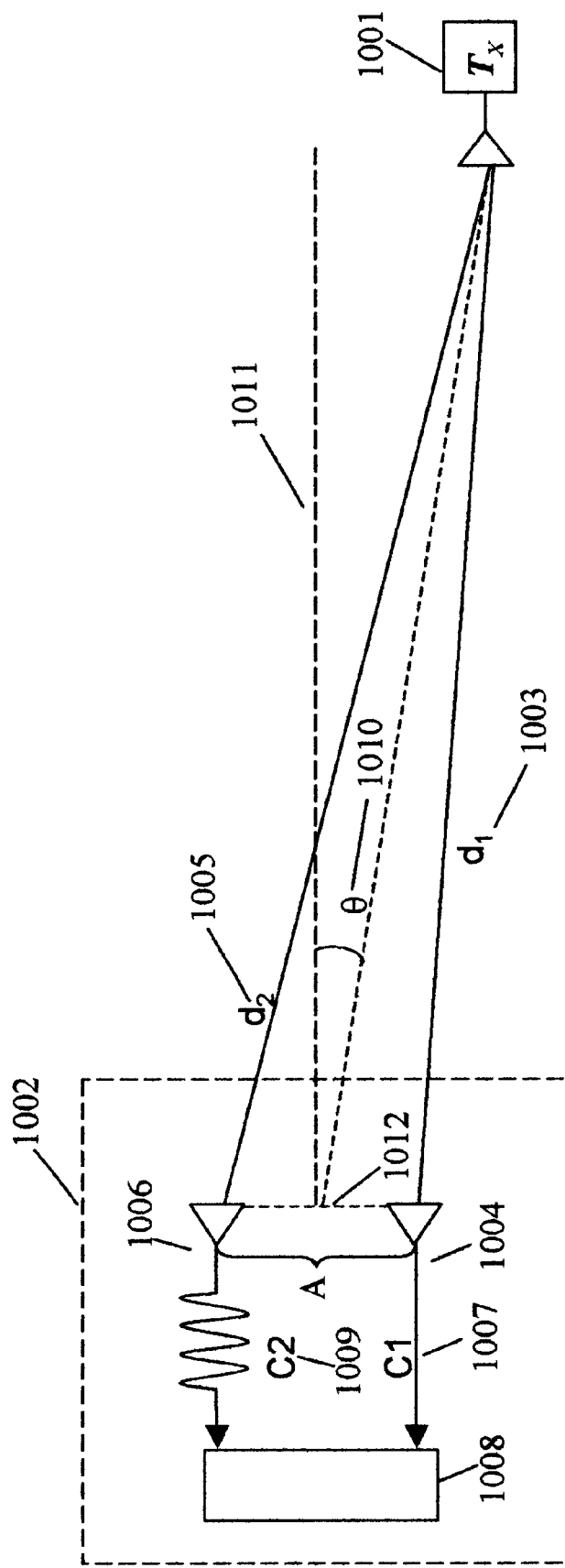
FIG. 10A depicts a typical transmitter-to-receiver geometry.
FIG. 10B illustrates received pulses in the time domain.
Figure 10:
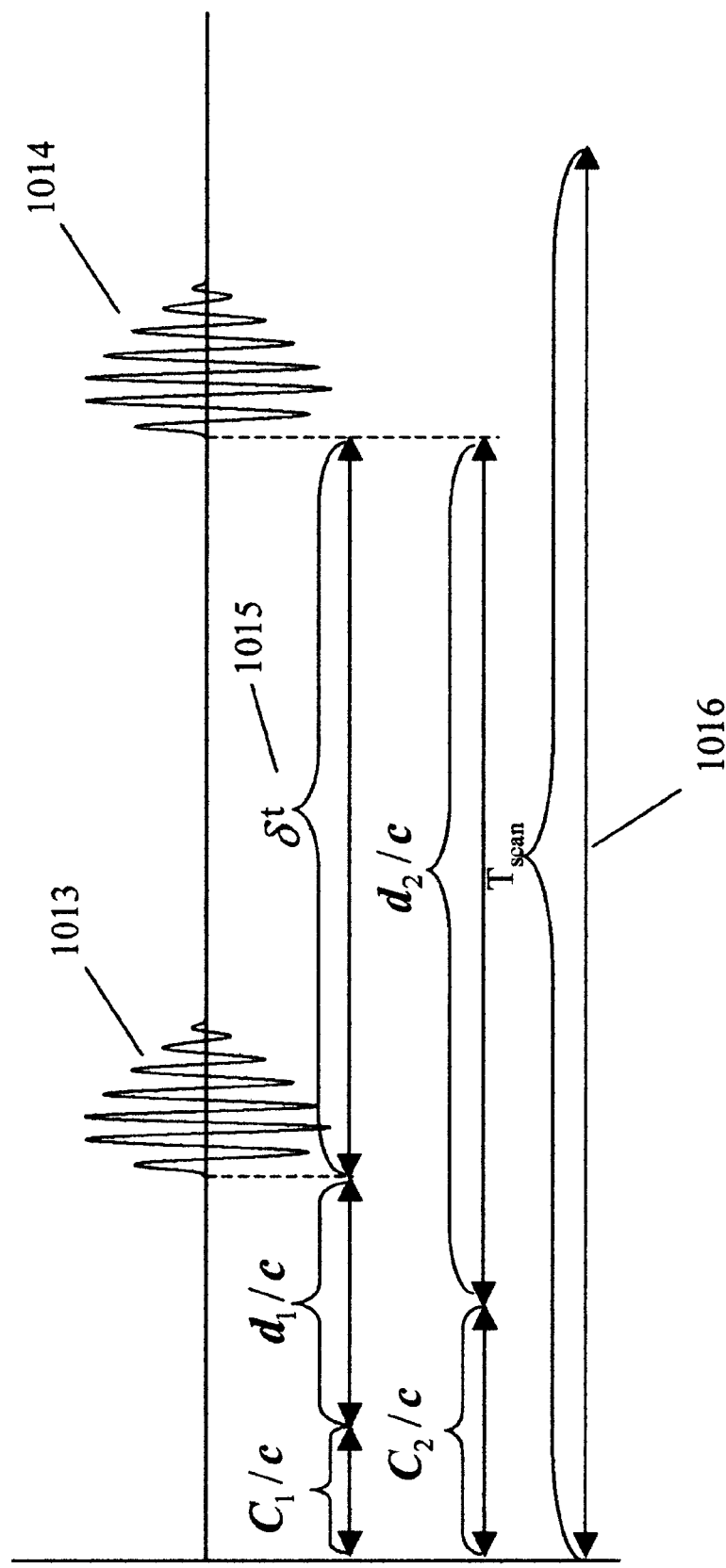

FIG. 10a illustrates the geometry of a transmitter 1001 with respect to a receiver 1002. Distance d1 1003 is the distance a transmitted signal must travel from the transmitter 1001 to the first antenna 1004. Likewise, Distance d2 1005 is the distance a transmitted signal must travel from the transmitter 1001 to the second antenna 1006. C1 1007 is the length of the connection between first antenna 1004 and the impulse radio 1008 and C2 1009 represents the length of the connection between the second antenna 1006 and the impulse radio 1008. Finally, θ 1010 is the angle of offset of the transmitter from a perpendicular 1011 projected from the midpoint 1012 between the first antenna 1004 and the second antenna 1006.

FIG. 10b depicts the signal received by the impulse radio in the time domain. Pulse 1 1013 is the pulse received from the first antenna, and Pulse 2 1014 is the pulse received from the second antenna. δt 1015 is the difference in times of arrival of the two pulses. The time of arrival of Pulse 1 1013 at the impulse radio is length of travel from the transmitter 1001, or $d_1$ 1003, plus the length of the connection C1 1007, divided by the speed of light, c. Likewise, the arrival time of Pulse 2 1014 is found by dividing the sum of its length of travel $d_2$ 1005 and $C_2$ 1009, by the speed of light. Thus, δt 1015 is given by:

$$\delta t = \frac{(d_2 + C_2 - d_1 - C_1)}{c}$$

Various methods may be used to measure δt. When the impulse radio 1008 receives the composite waveform, it performs an initial scan. A simple autocorrelation function may be applied to the received waveform over the entire period of scan, $T_{SCAN}$ 1016. The autocorrelation function results in two amplitude peaks when viewed in the time domain. One peak occurs at zero delay time and the second peak occurs at some δt after the first.

Processing time may be saved by truncating this procedure under certain assumptions. For example, the arrival of the second pulse will occur sometime within an interval corresponding to the antennae separation distance, A 905 from FIG. 9, or A/c. If the transmitter is offset ±90° from the midpoint reference 906, the difference in path distance, d1–d2, is ±A/c. Further, the second pulse will not arrive until some time after the arrival of the first pulse, this delay being associated with the cable delay, $t_c$. Thus, with reference to FIG. 11a, once Pulse 1 1101 is detected in the impulse radio by conventional correlation or sampling means described in the Overview section above, the impulse radio may be programmed to scan only the interval of time 1102 equal to 2A/c and centered at time $t_c$ 1103 after Pulse 1 1101. To increase the probability that Pulse 2 1104 will occur within the scanning interval 1102, the interval may include some time to provide a margin of error.

Processing time may be further reduced by employing a leading edge detection algorithm such as the type described in co-pending and co-owned application Ser. No. 09/915,891, filed Jul. 26, 2001, which is incorporated herein by reference. Using leading edge detection, the leading edge of Pulse 1 1101 is found. The impulse radio may be programmed to reserve an interval of time containing Pulse 1, referred to herein as $T_{PULSE}$ 1105, the duration of which corresponds to a pulse width plus some margin for error. A cross-correlation function or a sampling function is now applied over both intervals resulting in the amplitude peaks described above, the time between which represents δt 1015.

Figure 11:
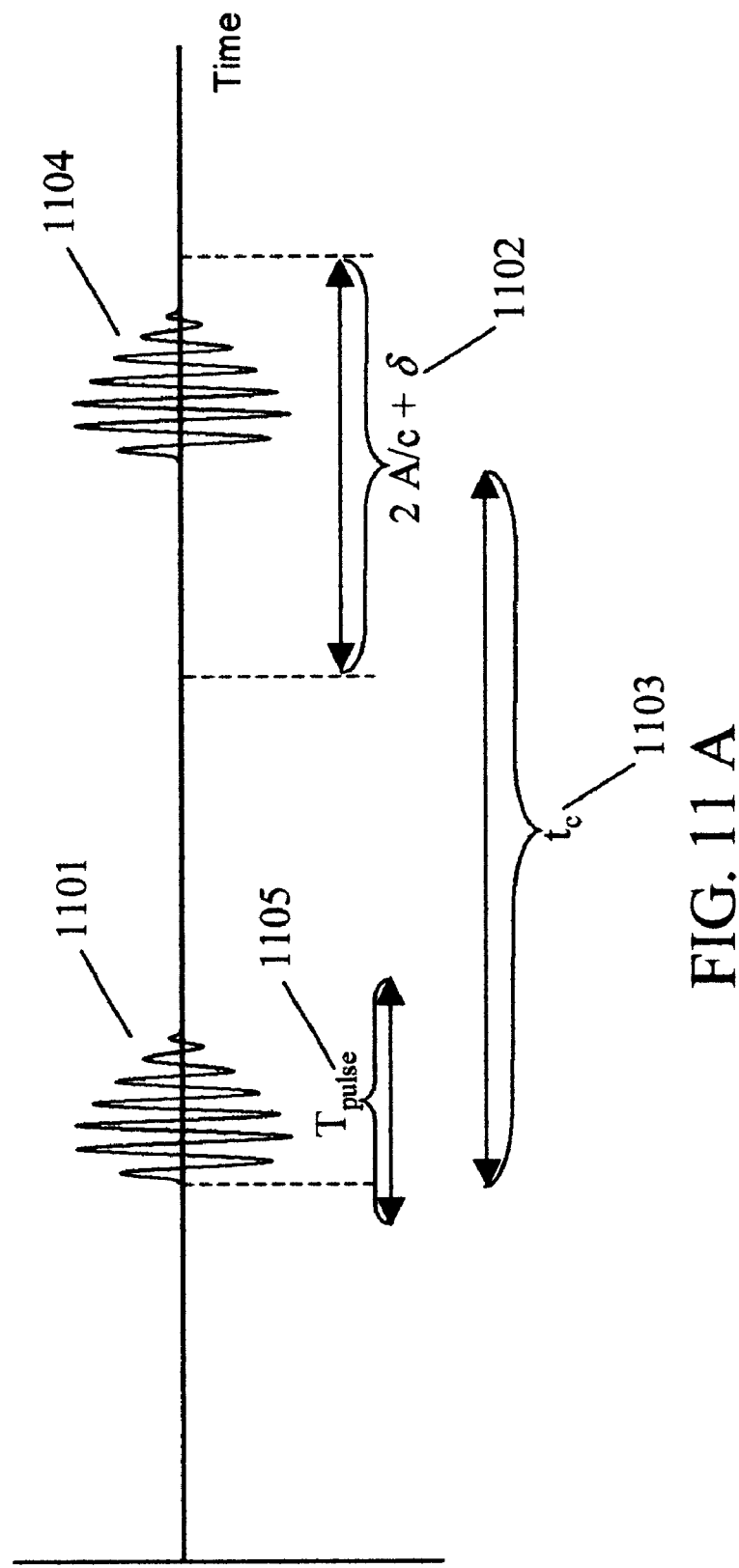
FIG. 11A illustrates received pulses in the time domain using a shortened scan process.
FIG. 11B illustrates received pulses in the time domain using leading edge detection and cross-correlation.
Figure 11:
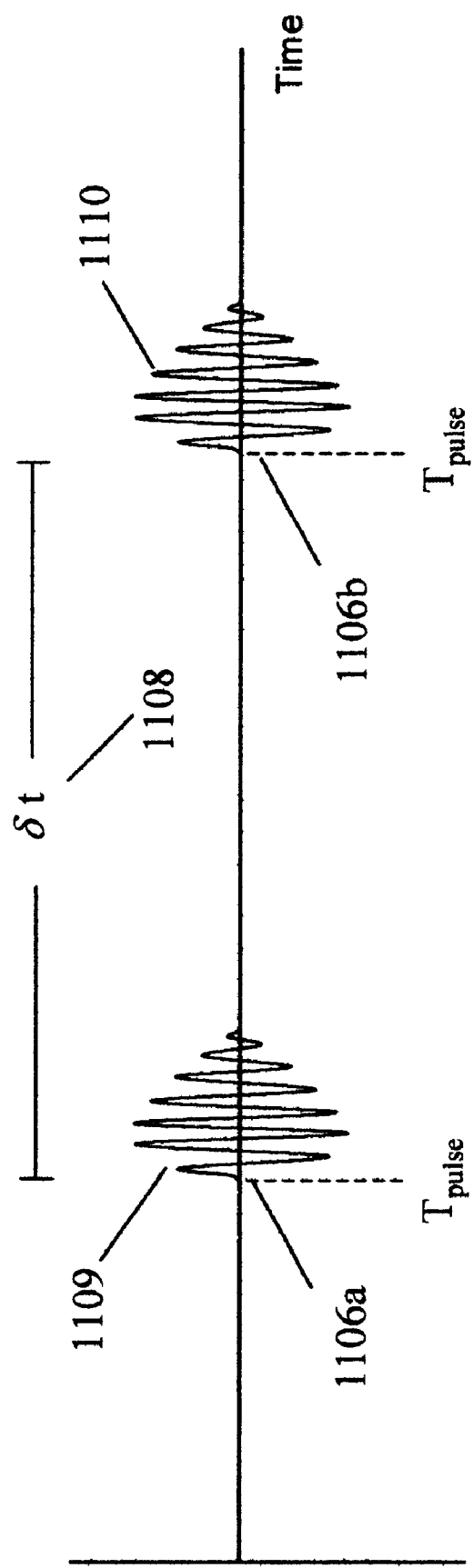

FIG. 11b depicts use of leading edge detection methods to find the leading edges of both pulses 1106a and 1106b combined with cross-correlation to determine both peak times. Once the leading edges of both pulses are found, the pulses are both cross-correlated over intervals equal to $T_{PULSE}$ 1105. Additionally, it should be noted that the arrival time difference, δt 1108, may be found directly by finding the leading edges of both pulses 1106a and 1106b and measuring the time between them 1108.

Figure 12:
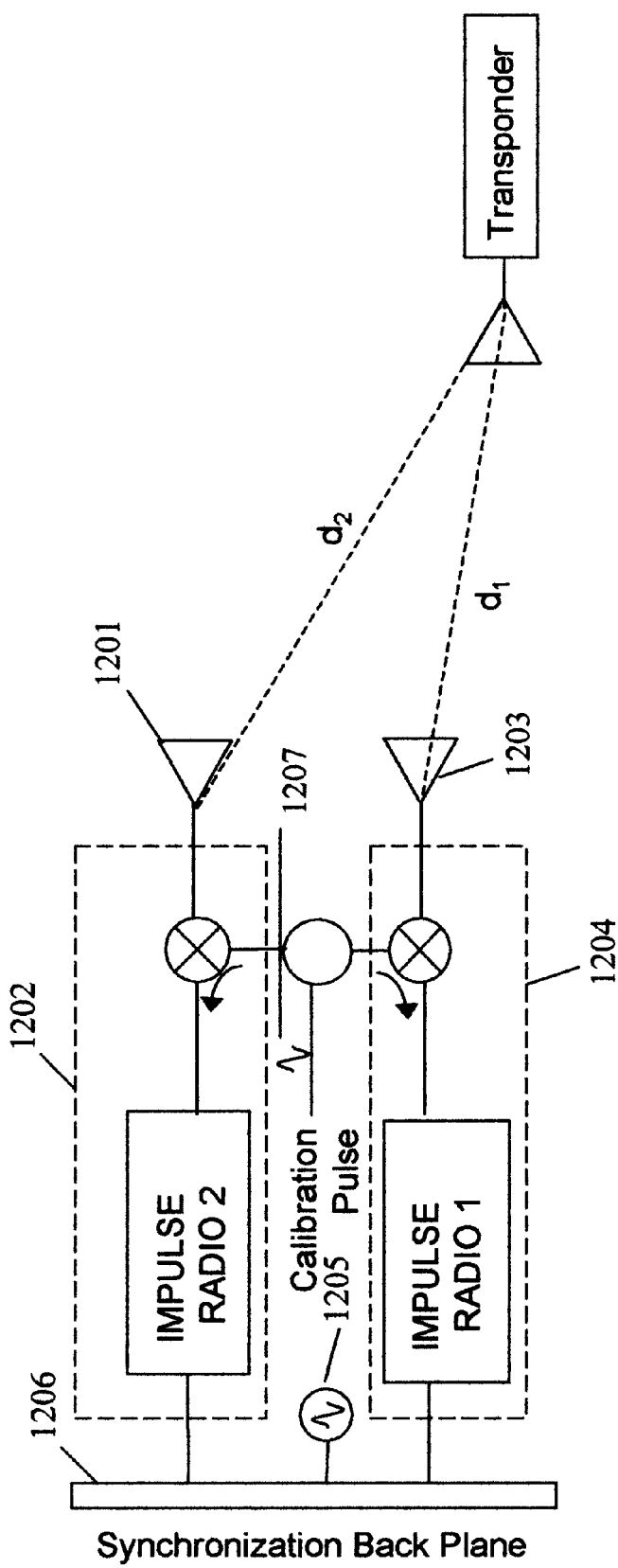
FIG. 12A depicts a dual radio receiver capable of determining angular offset of a transmitter.
FIG. 12B illustrates received pulses in the time domain in accordance with the apparatus described in FIG. 12A.
Figure 12:
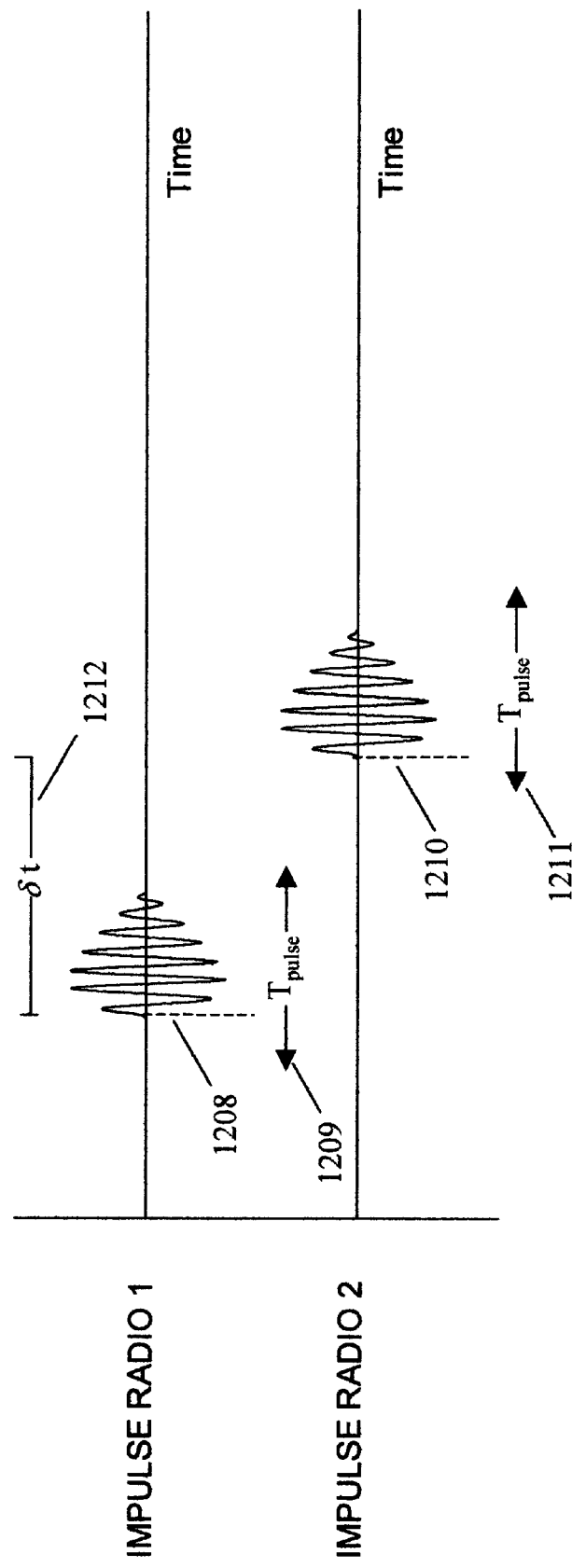

FIG. 12a illustrates another embodiment wherein two synchronized impulse receiver sets are used. A first antenna 1203 is coupled to a first correlating receiver 1204. Likewise, a second antenna 1201 is coupled to a second receiver 1202. The two receivers are synchronized by coupling both to a common oscillator 1205 on a synchronization back plane 1206. Though the relative timing of the receivers remains constant under the control of the common oscillator, there needs to be a calibration to define the absolute timing difference. Without calibration, a constant time difference error may exist between each receiver, which will manifest itself as a constant angle error.

Calibration is best achieved by measuring the signal from a known direction, and calculating the angle error between the known and calculated angles. This can be achieved by injecting a pulse 1207 simultaneously into both receiver correlators, replicating the condition where the transmitter offset θ 1010 is 0°. Comparing the resulting system measurement with 90° will reveal any error in the system and the system may be adjusted to compensate for this error.

With reference to FIG. 12b, pulse arrival times are measured by using a leading edge detection algorithm as described above. The leading edge of the first pulse 1208 is found and an interval equal to a pulse width plus some error margin, $T_{PULSE}$, 1209 is scanned by the first correlating receiver 1204. Similarly, the leading edge of the pulse received by the opposing receiver 1202 is found and the interval 1211 encompassing this pulse is scanned. As with the embodiments described above, the time between the resulting correlation peaks is measured. Since no cable delay is used in this method, the difference in time is contributed solely by the angle of the transmitter with respect to the receiver unit. Additionally, the time of arrival of both pulses may be measured directly my calculating the difference in time of the leading edges.

Once the arrival time at the receiver, δt, is determined, the offset angle θ is calculated. Two formulae are used. Both methods depend upon the time differential due to the relative angle, $t_d$. For the embodiments described above which incorporate the cable delay, $$t_d = \delta t - t_c$$

where $t_c$ is the delay resulting from the greater cable length connecting the second antenna to the impulse radio. For embodiments without the cable delay, $t_d$ is simply δt.

For near-field geometries, i.e. where the transmitter is relatively close to the receiver unit, the offset angle, θ, may be derived using the Law of Cosines as follows:

$$\theta \cong 180 - \frac{1}{2}\cos^{-1}\left(\frac{t_d^2 c^2}{2a^2} - 1\right)$$

where a is half the antennae separation distance. Conversely, for far-field lay-outs, i.e., where down-range distance is much greater than the antennae separation distance, the approximation may be simplified by assuming arrival paths are parallel. Thus, θ may be found using the following:

$$\theta \cong \sin^{-1}\left(\frac{t_d c}{2a}\right)$$

Figure 13:
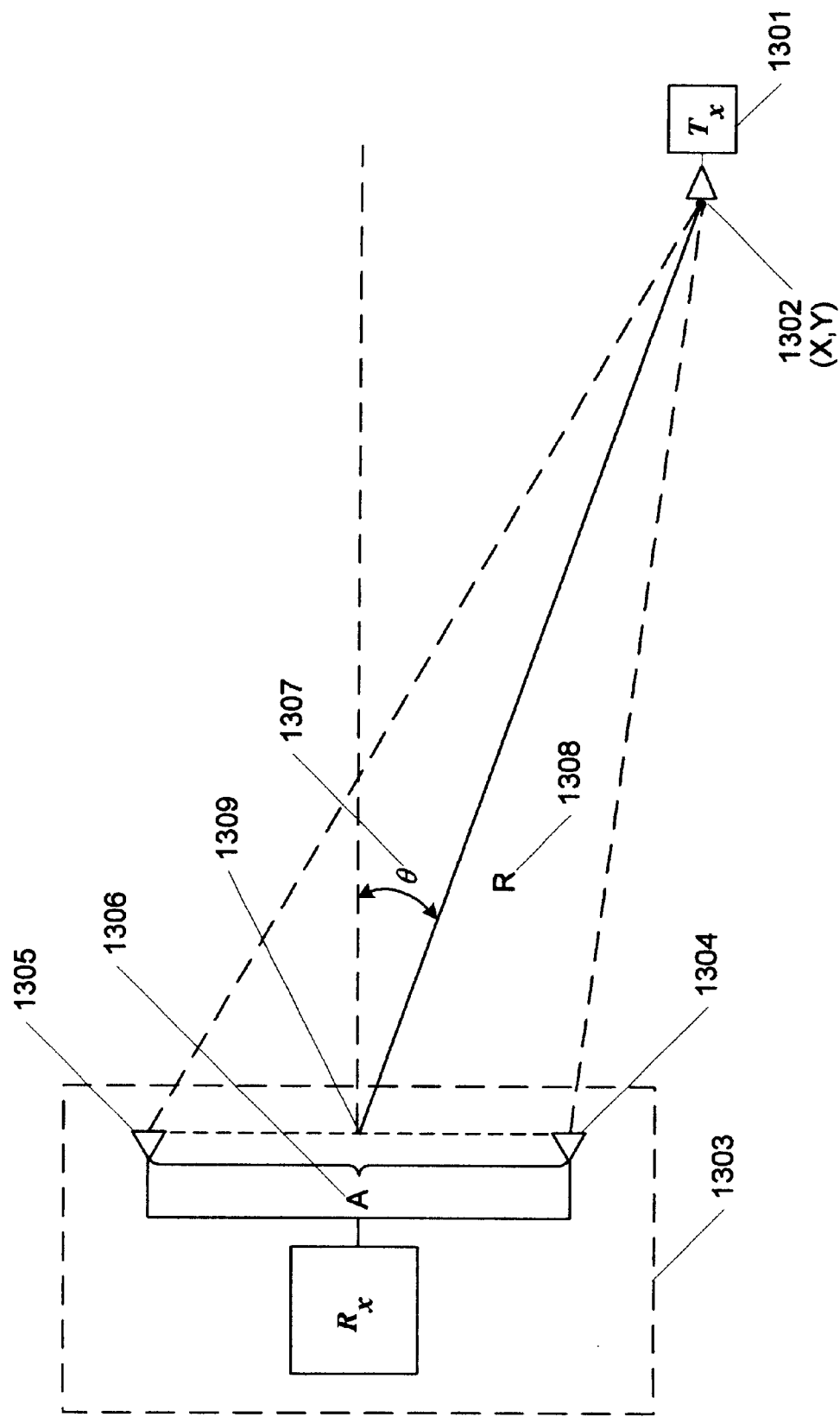
FIG. 13 depicts geometric values necessary to locate transmitter in two dimensions.

Those skilled in the art will appreciate that once the offset angle is known, then the transmitter's horizontal position relative to the receiver may be found in either polar coordinates or Cartesian coordinates. For example, with reference to FIG. 13, a transmitter 1301 sits at unknown coordinates, (X, Y) 1302, relative to the receiver 1303 configured with a first antenna 1304 and a second antenna 1305 separated by some known distance, A 1306. Once the offset angle, θ 1307, is estimated, the slant range R 1308, from the receiver reference point 1309 to the transmitter 1301 may be derived. The relationship between the difference in signal arrival time, $t_d$ and R may be shown by the following equation:

$$t_d c = \sqrt{\left(R\sin\theta - \frac{A}{2}\right)^2 + (R\cos\theta)^2} - \sqrt{\left(R\sin\theta + \frac{A}{2}\right)^2 + (R\cos\theta)^2}$$

Thus, R 1308 may be solved for and the polar coordinate position of the transmitter relative to the receiver is known. From this information, the Cartesian coordinates may be derived.

Those skilled in the art will also appreciate that addition of a third antenna to the receiver unit and configured with a unique delay with respect to the first two antennae, or with it's own correlator, will allow for the estimation of two offset angles, thus, refining the solution for the location of the transmitter. Addition of a fourth antenna, similarly configured, will result in three angle estimates and makes possible determination of coordinates in three dimensions.

For the two-antennae configuration, angular error, in degrees, is a function of the distance separating the antennae and is expressed by the following formula:

$$\delta\theta = \frac{180}{2A/s}$$

where A is the antennae separation distance and s is the receiver scan interval. Thus, angular error improves as the antennae separation increases or as the scan interval decreases.

Another embodiment uses tracking correlators whereby once the pulses are located in time, one tracking correlator is locked onto the first arriving pulse and another correlator is locked onto the second arriving pulse. Using this technique, time is not lost in rescanning the waveform to find $t_d$. The transmitter offset angle may be computed at each receiver pulse integration rate, thereby providing virtual real-time updating of the transmitter's position relative to the receiver. For example, if the integration rate is 64 pulses per bit, the non-locking method previously described produced an answer every 13 ms when scanning is taken into account. At the same pulse integration rate, the locking technique results in an answer every 6.4 μs. If the transmitter were traveling at 200 mph, it moves only 0.572 mm in that time. In 13 ms, the same fast-moving transmitter moves 3.8 ft. This method is, therefore, beneficial to applications requiring accuracy of position for traveling objects, particularly objects traveling at high rates.

As described above and shown in the associated drawings, the present invention comprises a system and method for determining the relative offset of an impulse radio an transmitter relative to a receiver. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. An impulse radio receiver, comprising:
   an impulse radio;
   a first antenna coupled to said impulse radio by a first coupling;
   a second antenna coupled to said impulse radio by a second coupling; and
   a receiver processor coupled to said impulse radio;

said impulse radio is a direct conversion impulse radio that includes at least one scanning correlator which scans at least one interval in a time domain to enable said receiver processor to locate a leading edge of impulse radio pulses received by said first antenna and to locate a leading edge of impulse radio pulses received by said second antenna which enables said receiver processor to approximate a position of an impulse radio transmitter by calculating an angular offset based upon arrival times of the impulse radio pulses transmitted by said impulse radio transmitter and received at said first antenna and second antenna.

2. The impulse radio receiver according to claim 1, further comprising three or more antennae coupled to said impulse radio by couplings, such that one such coupling length is less than the remainder of said couplings' lengths and all coupling lengths are unique.

3. The impulse radio receiver according to claim 1, wherein said impulse radio further includes at least one tracking correlator.

4. The impulse radio receiver according to claim 1, wherein said second coupling is of greater length than said first coupling.

5. The impulse radio receiver according to claim 4, further comprising a third antenna coupled to said impulse radio by a third coupling, said third coupling being greater than said first coupling and unequal to said second coupling.

6. The impulse radio receiver according to claim 5, further comprising a fourth antenna coupled to said impulse radio by a fourth coupling, said fourth coupling being greater than said first coupling and unequal to said second coupling and said third coupling.

7. An impulse radio receiver comprising:
a first antenna and a second antenna;
a first impulse radio coupled to said first antenna;
a second impulse radio coupled to said second antenna;
a synchronizing signal generator having an output coupled to said first impulse radio and an output coupled to said second impulse radio for synchronously engaging said first and second impulse radios; and
a processor having an input responsive to said first and said second impulse radios, said processor being enabled to locate the leading edges of impulse radio pulses transmitted by an impulse radio transmitter and received at said first antenna and said second antenna and to approximate a position of the impulse radio transmitter by calculating an angular offset based upon arrival times of the impulse radio pulses.

8. A method for finding angular offset of an impulse radio transmitter from an impulse radio receiver comprising the steps of:
receiving from a said impulse radio transmitter an impulse radio signal using an impulse radio receiver, said impulse radio receiver comprising a first antenna coupled to an impulse radio by a first coupling and a second antenna coupled to said impulse radio by a second coupling, wherein said second coupling is of greater length than said first coupling;
determining an arrival delay of a second pulse with respect to a first pulse, said first pulse being received by said first antenna and said second pulse being received by said second antenna, wherein said step of determining an arrival delay further includes:
locating said first leading edge of said first pulse;
tracking said first leading edge;
correlating over a first interval, said first interval corresponding to the duration of a pulse, said first interval commencing prior to said first leading edge;
correlating over a second interval, said second interval corresponding to the distance separating said first and said second antennae and occurring after said first pulse; and
approximating an angle of arrival of said pulses with respect to a point between said first antenna and said second antenna based upon said arrival delay.

9. The method according to claim 8, wherein said step of determining said arrival delay further comprises locating and tracking said first pulse and said second pulse with respect to time.

10. The method according to claim 8, wherein said step of determining an arrival delay further comprises auto-correlating a waveform comprised of said first and said second pulses over an interval enveloping the arrival time of said first and said second pulses.

11. The method according to claim 8, wherein said step of determining an arrival delay further comprises measuring a time of arrival of a first leading edge of said first pulse.

12. The method according to claim 8, wherein said step of determining an arrival delay further comprises measuring a time of arrival of a second leading edge of a second pulse.

13. The method according to claim 8, wherein said impulse radio receiver further comprises a third antenna coupled to said impulse radio by a third coupling, said third coupling being of greater length than said first coupling and unequal to said second coupling length.

14. The method according to claim 13, wherein said step of determining an arrival delay further comprises determining an arrival delay of a third pulse received by said third antenna.

15. The method according to claim 14, wherein the step of approximating an angle of arrival further comprises approximating a first angle of arrival in the horizontal plane and a second angle of arrival in the vertical plane.

16. The method according to claim 13, wherein said impulse radio receiver further comprises a fourth antenna coupled to said impulse radio by a fourth coupling, said fourth coupling being of greater length than said first coupling and unequal to said second and third coupling lengths.

17. A method for finding angular offset of an impulse radio transmitter from an impulse radio receiver comprising the steps of:
receiving from a the impulse radio transmitter an impulse radio signal using an impulse radio receiver, said impulse radio receiver comprising a first antenna coupled to a direct conversion impulse radio and a second antenna coupled to said direct conversion impulse radio that includes at least one scanning correlator which scans at least one interval in a time domain to enable a processor to locate a leading edge of the impulse radio signal received by said first antenna and to locate a leading edge of the impulse radio signal received by said second antenna;
measuring the arrival time of the leading edge of a first pulse of said impulse radio signal received by said first antenna;
measuring the arrival time of the leading edge of a first pulse of said impulse radio signal received by said second antenna; and
approximating a position of the impulse radio transmitter by calculating an angular offset based upon arrival times of the impulse radio pulses transmitted by said impulse radio transmitter and received at said first antenna and second antenna.

18. The method according to claim 17, wherein said direct conversion impulse radio tracks said leading edge of a first pulse of said impulse radio signal received by said first antenna.

19. The method according to claim 18, wherein said direct conversion impulse radio tracks said leading edge of a first pulse of said impulse radio signal received by said second antenna.

20. The method according to claim 18, wherein said impulse radio receiver is further comprised of a third antenna coupled to said direct conversion impulse radio.

21. The method according to claim 20, further comprising measuring the arrival time of a leading edge of a first pulse of said impulse radio signal received by said third antenna.

22. The method according to claim 21, wherein said impulse radio receiver is further comprised of a fourth antenna coupled to said direct conversion impulse radio.

23. The method according to claim 22, further comprising measuring the arrival time of a leading edge of a first pulse of said impulse radio signal received by said fourth antenna.

24. The method according to claim 23, wherein the step of calculating an angle of arrival further comprises approximating a first angle of arrival in the horizontal plane and a second angle of arrival in the vertical plane.

25. A method for determining a position of the impulse radio transmitter relative to an impulse radio receiver comprising the steps of:

receiving from a the impulse radio transmitter an impulse radio signal using the impulse radio receiver, said impulse radio receiver comprising a first antenna coupled to a first impulse radio by a first coupling and a second antenna coupled to a second impulse radio by a second coupling, said first and second impulse radios being synchronously engaged;

determining an arrival delay of a second pulse with respect to a first pulse, said first pulse being received by said first impulse radio and said second pulse being received by said second impulse radio; and approximating an angle of arrival of said pulses with respect to a point between said first antenna and said second antenna based upon said arrival delay which enables the determination of the position of the impulse radio transmitter.

26. The method according to claim 25, wherein said step of determining an arrival delay further comprises:

correlating said first pulse using said first impulse radio; and correlating said second pulse using said second impulse radio.

27. The method according to claim 26, wherein said step of determining an arrival delay further comprises measuring the time of arrival of a first leading edge of said first pulse and of a second leading edge of said second pulse.

* * * * *